May 18, 1926.
E. A. SCHMUTTE
TRACTOR PLOW
Filed Feb. 5, 1925
1,584,962
3 Sheets-Sheet 1
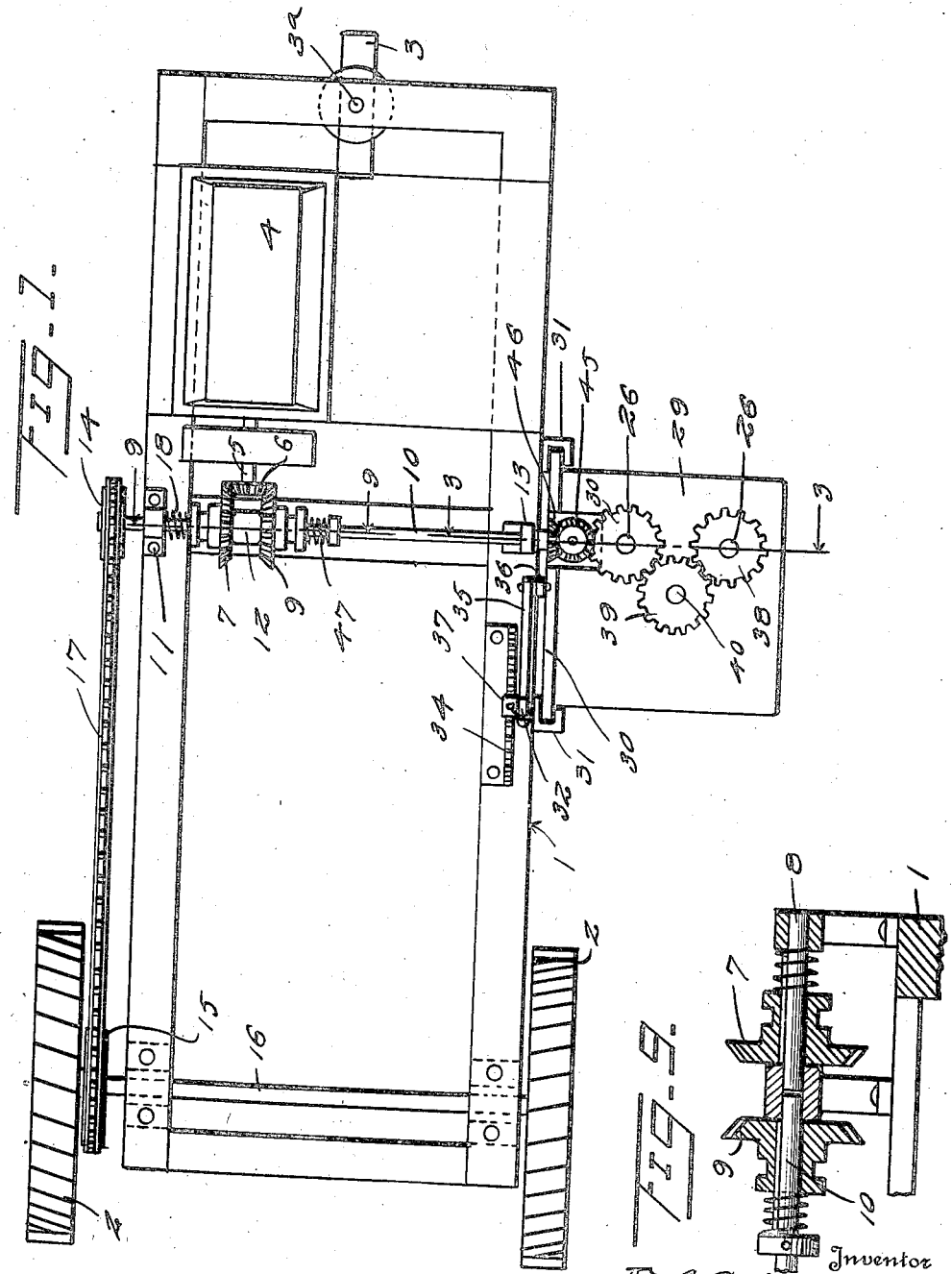

May 18, 1926.
E. A. SCHMUTTE
TRACTOR PLOW
Filed Feb. 5, 1925
1,584,962
3 Sheets-Sheet 2
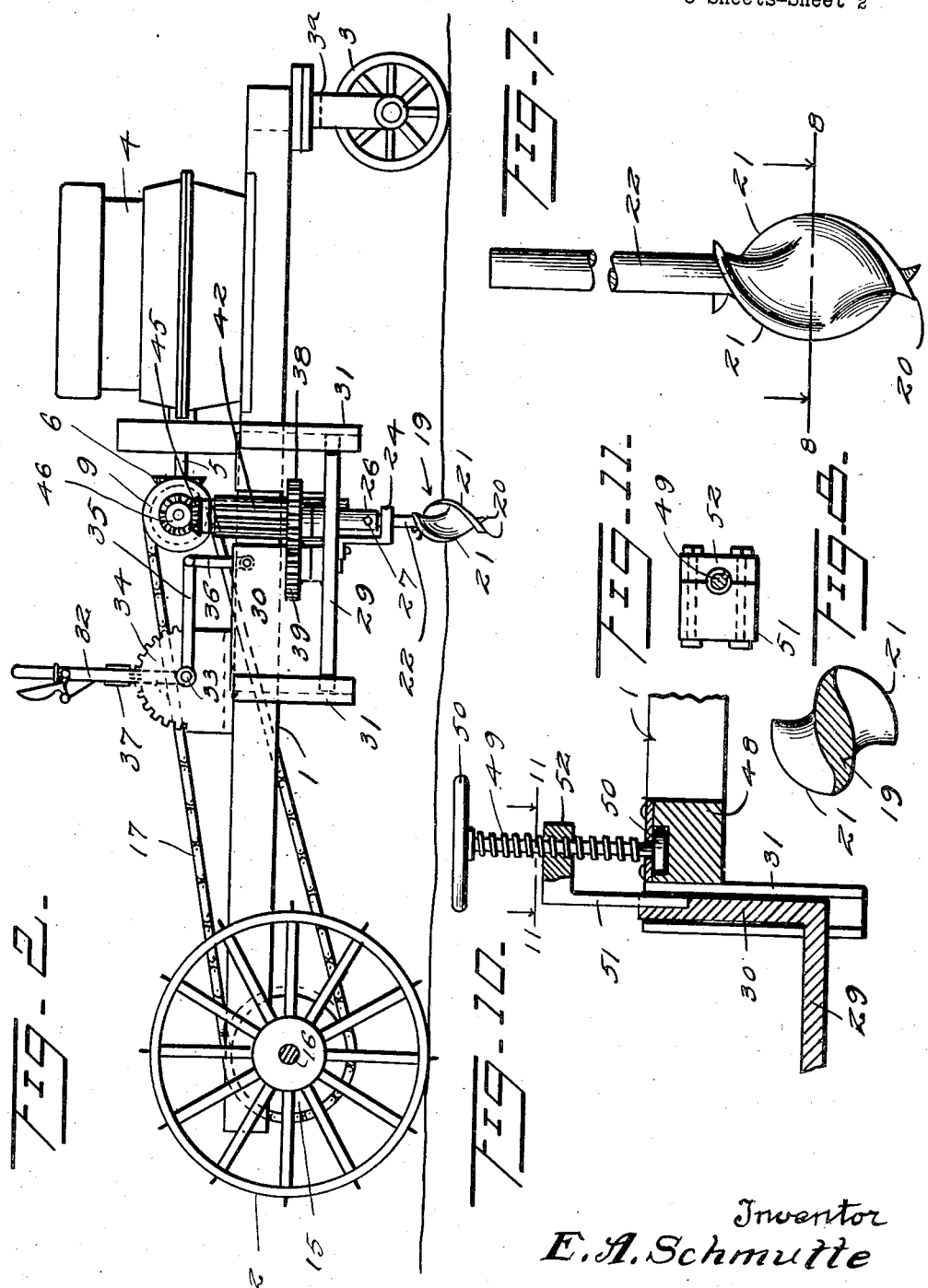
Inventor
E. A. Schmutte
By May 18, 1926.
E. A. SCHMUTTE
TRACTOR PLOW
Filed Feb. 5, 1925
1,584,962
3 Sheets-Sheet 3
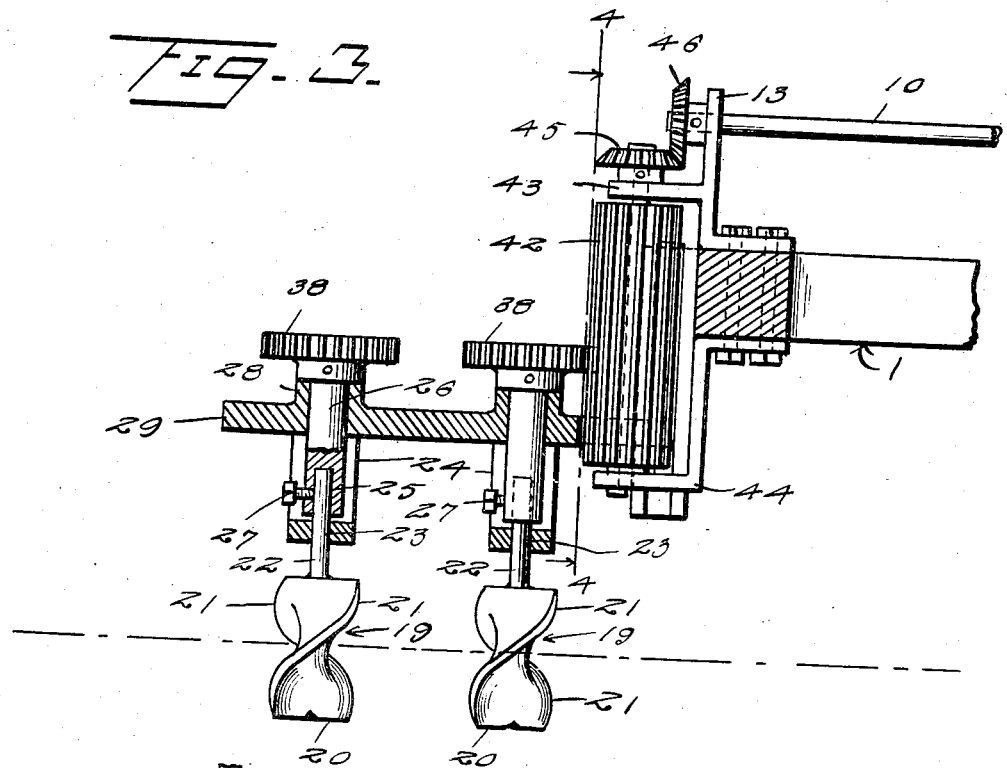
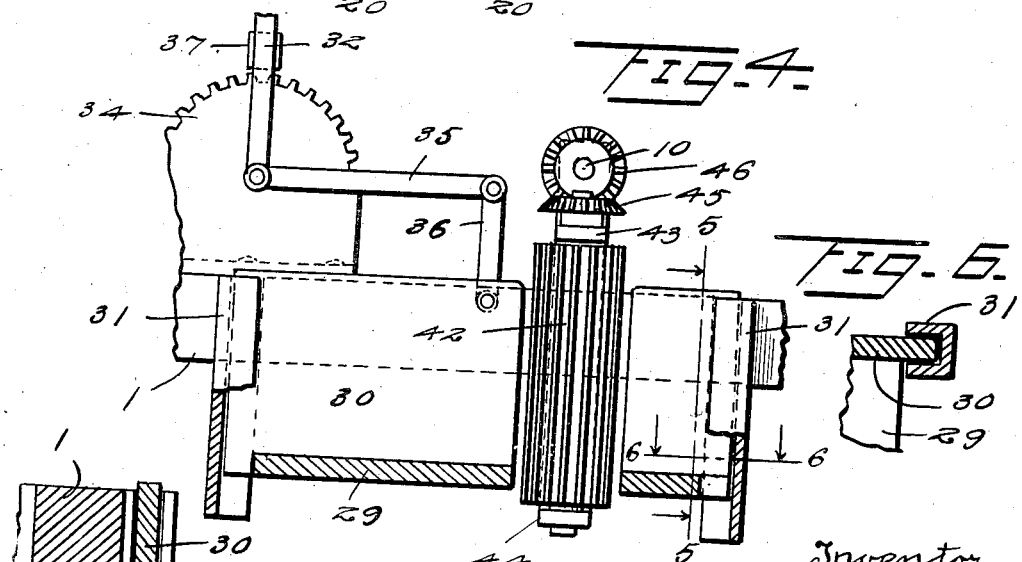
Inventor
E. A. Schmutte Patented May 18, 1926.

1,584,962

UNITED STATES PATENT OFFICE.

ERNEST A. SCHMUTTE, OF WHITE BLUFF, TENNESSEE.

TRACTOR PLOW.

Application filed February 5, 1925. Serial No. 7,112.

This invention relates to tractor plows, and has for one of its objects the provision of a machine of this character having vertically arranged rotary plowshares in the form of cylindrical augers.

A further object of the invention is the provision of novel and simple means through the medium of which the depth of penetration of the plowshares in the ground may be regulated.

A still further object of the invention is the provision of novel and simple means for rotating the plowshares.

With the above and other objects in view, the invention consists of the construction, combination and arrangement of parts hereinafter fully described and claimed, and illustrated in the accompanying drawings, wherein:

Figure 1 is a top plan view of a tractor plow embodying my invention,

Figure 2 is a view in side elevation of the tractor plow,

Figure 3 is a detail sectional view taken on the vertical plane indicated by the line 3—3 of Figure 1, Figure 4 is a detail sectional view taken on the vertical plane indicated by the line 4—4 of Figure 3, Figure 5 is a detail sectional view taken on the vertical plane indicated by the line 5—5 of Figure 4, Figure 6 is a detailed sectional view taken on the horizontal plane indicated by the line 6—6 of Figure 4, Figure 7 is a detail plan view of one of the plowshares, Figure 8 is a sectional view taken on the horizontal plane indicated by the line 8—8 of Figure 7, Figure 9 is a detail sectional view taken on the horizontal plane indicated by the line 9—9 of Figure 1, Figure 10 is a detail sectional view of a modified form of the means by which the depth of penetration of the plowshares may be regulated, and Figure 11 is a detail sectional view taken on the horizontal plane indicated by the line 11—11 of Figure 10.

Corresponding and like parts are referred to in the following description, and designated in the accompanying drawings, by similar reference characters.

In the drawings, 1 designates the frame, 2 the drive wheels, 3 the pilot wheel and 4 the internal combustion engine of a tractor. Any well known or appropriate steering mechanism may be connected to the shaft 3ª of the pilot wheel 3. The crank shaft 5 of the engine 4 carries a bevel pinion 6 which meshes with a bevel gear 7 splined to a shaft 8 and a bevel gear 9 splined to a shaft 10. The shafts 8 and 10 are arranged in endwise relation and are supported in transverse arrangement with respect to the frame 1 by bearing brackets 11, 12 and 13. The drive wheels 2 are rotated from the shaft 8 through the medium of a sprocket wheel 14 secured to this shaft, a sprocket wheel 15 secured to the axle 16 to which the drive wheels are fixed, and a sprocket chain 17. The beveled gear 7 is held in mesh with the bevel pinion 6 by a spring 18, and any suitable shifting means, not shown, may be employed in connection with the gear 7. The engine 4 and the means for imparting motion to the drive wheels 2 from the shaft 8, are arranged at one side of the frame 1, and the plowshares and associate parts are arranged at the opposite side of the frame, whereby to so balance the machine that it may be easily steered in a straight path.

The plowshares 19 are vertically arranged and are provided with straight lower edges 20 and spiral blades 21. The spiral blades 21 of each plowshare 19 are reversely arranged so as to throw the dirt in opposite directions from the lateral sides thereof. The plowshares 19 are provided with shanks 22 which extend upwardly through bearing openings 23 in brackets 24 and which have their upper ends secured in sockets 25 formed in the lower ends of shafts 26. Set screws 27 are employed to secure the shanks 22 to the shafts 26. The shafts 26 are journaled in bearings 28 carried by a plate 29 to the under side of which the brackets 24 are secured. The plate 29 extends laterally from the frame 1 and is connected at its inner end to the frame for vertical adjustment by means of a crosshead 30 and guides 31. The crosshead 30 extends upwardly from the inner end of the plate 29, and the guides 31 are secured to the side of the frame 1. The means by which the plowshares may be raised or lowered to regulate their depth of penetration, comprises a hand lever 32 pivoted at 33 to a notched quadrant 34, an arm 35 fixed to the lever, and a link 36 connected to the arm and crosshead 30. The lever 32 is provided with a latch 37 which cooperates with the notches of the quadrant 34 to secure the plowshares 19 in adjusted position. The shafts 26 are each provided with a gear 38 with which an idle gear 39 meshes. The idle gear 39 is carried by a stub shaft 40 journaled upon the plate 29. A vertically arranged drum gear 42 is journaled in brackets 43 and 44 secured to the frame 1, and meshes with one of the gears 38. The length of the drum gear 42 is sufficient to permit the gear 38 to maintain a driving engagement therewith in any adjustment of the plowshares 19. A beveled gear 45 is fixed to the upper end of the drum gear 42 and meshes with a beveled gear 46 secured to the shaft 10. The bevel gear 9 which is carried by this shaft is maintained in engagement with the bevel pinion 6 by a spring 47. Any suitable means, not shown, may be employed for the purpose of shifting the gear 9 into and out of engagement with the pinion 6.

Assuming that the engine 4 is operating and that the gears 7 and 9 are in mesh with the pinion 6, the drive wheels 2 and plowshares 19 will be simultaneously rotated. As the machine advances the plowshares 19 will form two furrows. Furrows of different depths may be formed by raising or lowering the plowshares 19 through the medium of the lever 32.

As suggested in Figure 10, the plowshares 19 may be secured to the rear end of the frame 1, and when this is done, the engine 4 is arranged in the center of the frame and the guides 31 are secured to the rear cross bar 48 of the frame. In this application of the plowshares a screw 49 is substituted for the parts 32, 34, 35 and 36, and a longitudinally extending shaft, not shown, is substituted for the shaft 10 in order to drive the drum gear 42. The screw 49 is vertically arranged, and is swiveled at its lower end as at 50 in the upper side of the cross bar 48 and is provided at its upper end with a hand wheel 50. A bracket 51 is secured to the crosshead 30 and is provided at its upper end with an arm 52 through which the screw 49 passes and with which the screw has threaded engagement.

From the foregoing description, taken in connection with the accompanying drawings, the advantages of the construction and of the method of operation of the machine will be readily apparent to those skilled in the art to which it appertains, and while I have described the principle of operation of the machine, together with the structure which I now consider to be the best embodiment thereof, I desire to have it understood that the machine shown is merely illustrative, and that such changes may be made therein as are within the scope of the invention as claimed.

What is claimed is:—

1. In combination with a tractor, of a vertically arranged drum gear journaled on the tractor, a driving connection between the drum gear and the engine of the tractor, a plate, a vertical tool-carrying shaft journaled in said plate, a gear secured to said shaft and meshing with said drum gear, and means for securing the plate to the tractor for vertical adjustment.

2. In combination with a tractor, of a vertically arranged drum gear journaled on the tractor and adapted to be driven from the engine thereof, a plate, vertical tool-carrying shafts journaled in said plate, a gear fixed to each shaft, an idle gear journaled on the plate and meshing with the gears fixed to said shafts, one of the latter gears meshing with the drum gear, and means for connecting the plate to the tractor for vertical adjustment.

In testimony whereof I affix my signature.

ERNEST A. SCHMUTTE.